(12) United States Patent
Adeeko, Jr.

(10) Patent No.: US 10,394,951 B1
(45) Date of Patent: Aug. 27, 2019

(54) AUTOMATIC GENERATION OF METRICS USING LANGUAGE PROCESSING

(71) Applicant: Direct Line to Compliance, Inc., Houston, TX (US)

(72) Inventor: Michael Olufemi Adeeko, Jr., Houston, TX (US)

(73) Assignee: Direct Line to Compliance, Inc., Houston, TX (US)

( * ) Notice: Subject to any disclaimer, the term of this patent is extended or adjusted under 35 U.S.C. 154(b) by 0 days.

(21) Appl. No.: 15/880,521

(22) Filed: Jan. 25, 2018

Related U.S. Application Data

(60) Provisional application No. 62/471,781, filed on Mar. 15, 2017.

(51) Int. Cl.
*G06F 17/27* (2006.01)
*G06K 9/00* (2006.01)

(52) U.S. Cl.
CPC ........ *G06F 17/274* (2013.01); *G06F 17/2705* (2013.01); *G06F 17/278* (2013.01); *G06K 9/00442* (2013.01)

(58) Field of Classification Search
CPC .. G06F 17/274; G06F 17/2705; G06F 17/278; G06K 9/00442
USPC ............................................................ 704/9
See application file for complete search history.

(56) References Cited

U.S. PATENT DOCUMENTS

2004/0205536 A1\* 10/2004 Newman ............... G06T 11/206
715/234
2006/0190804 A1\* 8/2006 Yang ..................... G06F 17/248
715/236
2016/0247245 A1\* 8/2016 Baic ........................ G06Q 50/18

OTHER PUBLICATIONS

Archive of "We Are Enterprise Compliance," Direct Line to Compliance, Inc., 1 page, [Archived by http://archive.org on May 10, 2016; Retrieved on Jun. 3, 2018] Retrieved from the Internet<URL:https://web.archive.org/web/20160510001023/http://www.dl2c.com/home>.
Archive of "Compliance Calculated," Direct Line to Compliance, Inc., 1 page, [Archived by http://archive.org on May 3, 2015; Retrieved on Jun. 3, 2018] Retrieved from the Internet<URL:https://web.archive.org/web/20150503171826/http://www.dl2c.com:80/cci.php>.
Archive of "Find Out the Facts About DL2C," Direct Line to Compliance, Inc., 1 page, [Archived by http://archive.org on Apr. 24, 2015; Retrieved on Jun. 3, 2018] Retrieved from the Internet<URL:https://web.archive.org/web/20150424220053/http://www.dl2c.com:80/about.php>.

\* cited by examiner

*Primary Examiner* — Quynh H Nguyen
(74) *Attorney, Agent, or Firm* — Fenwick & West LLP

(57) ABSTRACT

A server receives a rule-based digital document and automatically parses the documents into individual rules. A grammar analysis is applied to parse each individual rule into different elements that are categorized into different elements categories and a metric count is generated for the rule based on a total number of identified elements in the different categories. Information from an evidence database is processed to determine a count of the elements that are satisfied by the evidence information. A score is then automatically generated based on the number of satisfied metrics.

18 Claims, 7 Drawing Sheets

600

| | | | | | |
|---|---|---|---|---|---|
| 602 | Jack and Jill, assuming they are a boy and a girl, respectively, must paint, annually, their wagon in red and gold and Jack must replace monthly the wheels at three o'clock p.m. with their mother watching, in the backyard. | | | | |
| 604 | Named Entit(ies) | Directive(s) | Evidence | Attribute(s) | Supporting Evidence | Basis |
| 606 | Jack and Jill<br><br>NE1 | D1<br><br>must paint<br><br>NE1 | E1<br><br>the wagon<br><br>D1 | A1<br>who shall be a boy and girl, respectively<br>NE1<br>A2<br>annually<br>E1<br>A3<br>red<br>E1 | Birth Certificates<br><br>Photographs | Records Database |
| | Joe<br><br>NE2 | D2<br><br>must replace<br><br>NE2 | E2<br><br>the wheels<br><br>D2 | A4<br>monthly<br>D2<br>A5<br>Three o'clock p.m<br>D2<br>A6<br>With his mother watching D2<br>A7<br>In the backyard D2 | Maintenance Records | |
| 608 | 2 | 2 | 2 | 7 | 3 | Total: 16 |

FIG. 6

|     | 702 | 704 | 706 | 708 |
|-----|-----|-----|-----|-----|
| | Rule ID | Rule Text | Task | Compliance Score |
| | 1 | Text 1 | Task 1-1: Text<br>Task 1-2: Text<br>⋮<br>Task 1-N: Text | Score 1 |
| | 2 | Text 2 | Task 2-1: Text<br>Task 2-2: Text<br>⋮<br>Task 2-N: Text | Score 2 |
| | ⋮ | ⋮ | ⋮ | ⋮ |
| | 2 | Text 2 | Task 2-1: Text<br>Task 2-2: Text<br>⋮<br>Task 2-N: Text | Score N |

FIG. 7

AUTOMATIC GENERATION OF METRICS USING LANGUAGE PROCESSING

RELATED APPLICATIONS

This application claims the benefit of U.S. Provisional Patent Application No. 62/471,781 filed on Mar. 15, 2017, which is incorporated by reference herein.

FIELD OF ART

The present disclosure generally relates to language processing and more specifically to generating metrics associated with digital documents based on their language content.

BACKGROUND

Human interpretation of legal or regulatory documents often results in disagreement because different individuals subjectively arrive at their meaning. Because humans cannot always agree on what a particular document means, they also may not agree on whether or not particular rules in the document are satisfied. For example, compliance standards that regulate many industries often include complex regulatory language that is difficult to understand. As a result, businesses and auditors may disagree over whether or not the business is in compliance with the standard.

SUMMARY

A computer-implemented method generates metrics associated with a digital document. A server receives a digital standards document comprising a plurality of rules. Each of the plurality of rules in the digital standards document are identified. For a target rule in the plurality of rules, elements of the text of the target rule are identified that meet respective criteria for a predefined set of element categories. A metric count is generated for the target rule based on a total count of the elements meeting the respective criteria for the predefined set of element categories. The server receives evidence information indicating whether or not each of the elements are satisfied. A compliance count is generated representing a number of the elements in the target rule satisfied by the evidence information. A compliance score is generated for the target rule based on the metric count and the compliance count.

In another embodiment, a non-transitory computer-readable storage medium stores instructions that when executed by a processor causes the processor to execute the above-described method.

In yet another embodiment, a computer system includes a processor and a non-described transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FIG. 6 is an example embodiment of a user interface presented on a client device providing compliance information associated with a rule.

FIG. 7 is an example embodiment of a user interface presented on a client device providing compliance information associated with a set of rules.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
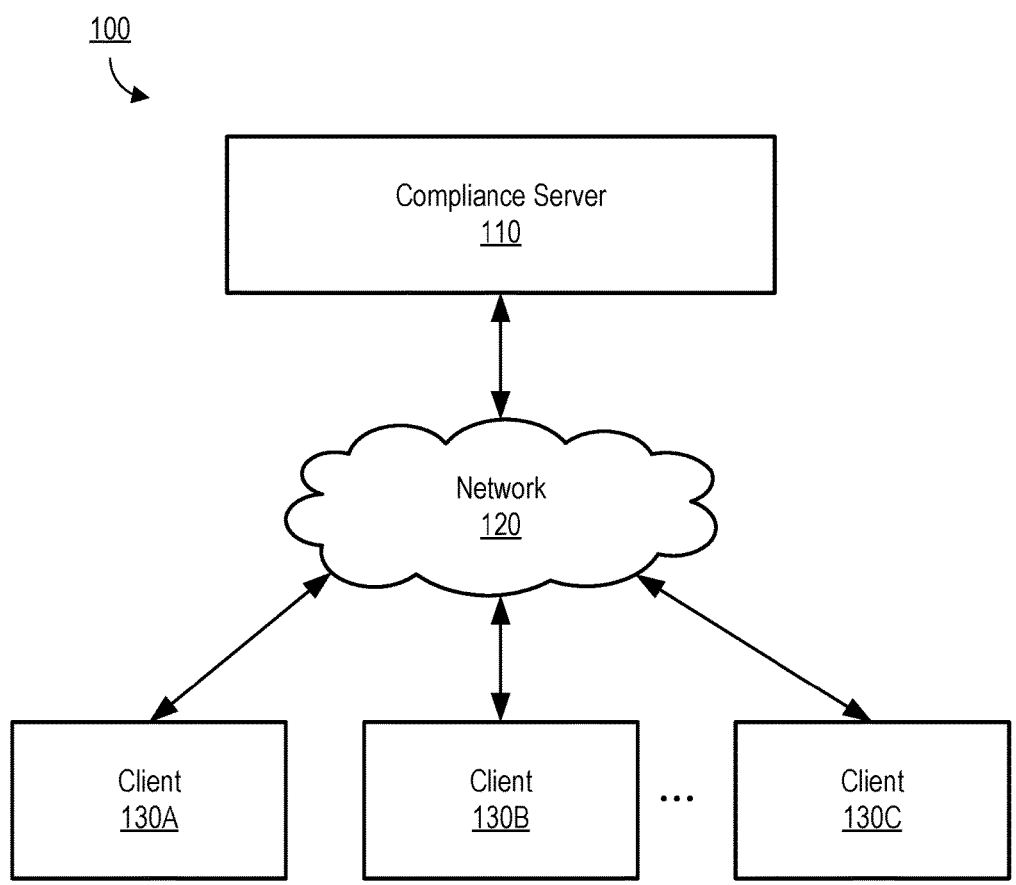
FIG. 1 is a block diagram of an example embodiment of a system environment for generating metrics using language processing.

FIG. 1 is a high-level block diagram illustrating a system environment 100 for a compliance processing application. The system environment 100 comprises a compliance server 110, a network 120, and various clients 130A, 130B, 130C (collectively referenced herein as clients 130). For simplicity and clarity, only one compliance server 110 and a limited number of clients 130 are shown; however, other embodiments may include different numbers of servers 110 and clients 130. Furthermore, the system environment 100 may include different or additional entities.

The network 110 represents the communication pathways between the server 110 and the clients 130. In one embodiment, the network 120 includes the Internet. The network 120 can also utilize dedicated or private communications links that are not necessarily part of the Internet such as private enterprise networks. In one embodiment, the network 120 uses standard communications technologies and/or protocols. Thus, the network 120 can include links using technologies such as Ethernet, Wi-Fi (802.11), integrated services digital network (ISDN), digital subscriber line (DSL), asynchronous transfer mode (ATM), etc. Similarly, the networking protocols used on the network 120 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 120 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client 120 comprises one or more computing devices capable of processing data and communicating with the network 120. For example, a client device 130 may be a desktop computer, a laptop computer, a smart phone, a tablet computing device, or any other device having computing and data communication capabilities. Each client 130 includes a processor for manipulating and processing data, and a non-transitory computer-readable storage medium for storing data and program instructions associated with various applications. Various executable programs may be embodied as computer-executable instructions stored to the non-transitory computer-readable storage medium. The instructions, when executed by the processor cause the client 130 to perform the functions attributed to the programs described herein.

The compliance server 110 is a computer system that processes data and communicates with other devices via the network 110. The compliance server 110 may include a singular computing system, such as a single computer, or a network of computing systems, such as a data center or a distributed computing system. In an embodiment, the compliance server 110 is a content or data server providing information to a client 130. For example, the compliance server 110 may be a website server that provides web content for viewing on clients 130. Furthermore, the compliance server 110 may be a file server that provides files that can be downloaded by the clients 130. The compliance server 110 may receive requests for data from the clients 130 and respond by transmitting the requested data to the clients 130. Like the clients 130, the compliance server 110 may execute one or more applications to carry out the functions attributed to the compliance server 110 herein.

Figure 2:
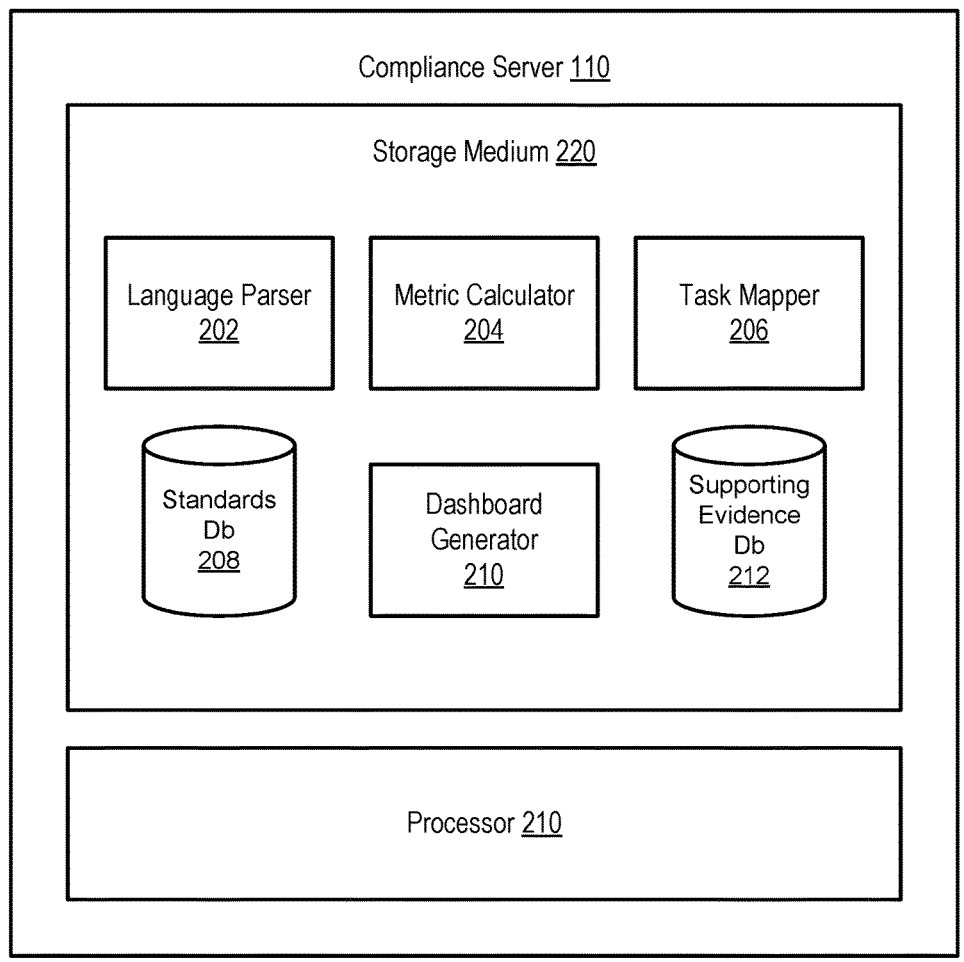
FIG. 2 is a block diagram of an example embodiment of a compliance server.

FIG. 2 illustrates an example embodiment of a compliance server 110. The compliance server 110 includes a processor 210 for manipulating and processing data, and a storage medium 220 (e.g., a non-transitory computer-readable storage medium) for storing data and program instructions associated with various application modules. The storage medium 220 stores various modules including a language parser 202, a metric calculator 204, a task mapper 206, and a dashboard generator 210. The storage medium 220 furthermore stores a standards database 208 and a supporting evidence database 212. Each of the modules (e.g., the language parser 202, metric calculator 204, task mapper 206, and dashboard generator 210) may be embodied as a set of instructions that when executed by the processor 210 cause the processor 210 to perform the functions attributed to the respective modules described herein. Furthermore, the various data stores (e.g., the standards database 208 and the supporting evidence database 212) may comprise file storage, database storage, or other storage mechanism for storing digital data. Alternative embodiments may include different or additional modules or omit one or more of the illustrated modules.

The standards database 208 stores one or more digital documents that each specifies one or more rules. Here, a rule is a statement that provides direction to an entity in relation to the entity's operations. For example, a digital document may be a regulatory standard that specifies a set of regulations that a business must comply with to avoid a penalty or some undesirable effect. In another example, the rules may provide laws governing how individuals must behave within a particular jurisdiction to avoid being subject to punishment. In yet another embodiment, the rules may comprise guidelines for how a business or individual should operate to achieve a particular goal.

The evidence database 212 stores information for determining whether or not a particular entity is compliant with one or more rules that may be set forth in an applicable standards document. For example, in one embodiment, the supporting evidence database 212 stores answers to questionnaires collected from different entities or entered by an administrator that may indicate directly or indirectly whether the entity is compliant with a particular rule or a portion thereof. In another embodiment, the supporting evidence database 212 may simply store binary values providing a yes or no indication of whether an entity is compliant with a particular component of a rule. In another embodiment, the supporting evidence database 212 may comprise a file storage system that stores one or more digital documents that may serve as evidence to show that a particular entity is compliant with one or more rules or portions thereof.

The digital documents or other data in the standards database 208 and the supporting evidence database 212 may be uploaded to the compliance server 110 via one or more clients 130 over the network 120 or may be uploaded from a device directly connected to the compliance server 110. In an embodiment, the compliance server 110 may perform a character recognition algorithm on an uploaded document if the document is not already in a machine-encoded text format. For example, a document that is scanned as an image may be converted to a machine-encoded text format.

The language parser 202 parses the language of documents in the standards database 208 to generate a data array associated with the digital document. The data array may comprise a plurality of data tables each corresponding to a single rule from the digital document. Each data table may comprise a plurality of entries that each corresponds to an element (e.g., an individual word, expression, or phrase) of the text of the rule or corresponds to some other metadata associated with the rule. The entries in the data table each have a plurality of fields that store different information associated with the entry. For example, the fields may include an identifier for the entry, content of an element forming part of the rule, an element category, and references to one or more other entries in the data table.

The element categories may include a predefined set of categories characterizing the text. For example, in one embodiment, the element categories may include a "named entity" category, a "directive" category, an "evidence" category, and an "attributes" category. The named entity category corresponds to text in the rule specifying one or more named entities that are subjected to the rule. The directive category corresponds to text specifying one or more actions that the rule directs the one or more named entities to take. The evidence category corresponds to text that indicates an object that should be addressed in evidence to show that the named entity has performed the specified action. The attributes category corresponds to text that specifies some characteristic of a named entity, a directive, or evidence. In an embodiment, an additional element category (e.g., an "other" category) may be used for elements that do not fall into any of the above-mentioned categories. For example, the "other" category may include related information, research, or references to contextual information.

To populate the data table, the language parser 202 first identifies individual rules in the digital document and generates a new entry for each rule. Then, the language parser 202 identifies elements in each rule that meet criteria for different element categories and categorizes the elements. For example, a grammar analysis may be applied to automatically identify and categorize text of the rule into the different categories. Typically, any given word in the rule forms part of at most one element and each element is placed into at most one category. However, each category may include more than one element for any given rule.

The language parser 202 may also identify and store references that indicate links between the elements. For example, an entry in the data table for a directive may store a reference to an entry for one or more named entities that are to perform the directive. An entry in the data table for evidence may store a reference to an entry for one or more directives that specify what actions are to be taken on an object to be addressed by the evidence. Furthermore, an entry in the data table for an attribute may store a reference to an entry for a named entity, a directive, or evidence to which the attribute applies.

An example data table is illustrated in Table 1 below and is populated based on a parsing of the following example rule: "Jack and Jill, who shall be a boy and a girl, respectively, must paint, annually, their wagon in red and Joe must replace monthly the wheels at three o'clock p.m. with his mother watching, in the backyard."

TABLE 1

| ID | Content | Category | References |
|---|---|---|---|
| NE1 | Jack and Jill | Named Entity | |
| A1 | who shall be a boy and a girl, respectively | Attribute | NE1 |
| D1 | must paint | Directive | NE1 |
| A2 | annually | Attribute | D1 |
| E1 | the wagon | Evidence | D1 |
| A3 | in red | Attribute | E1 |
| NE2 | Joe | Named Entity | NE2 |
| D2 | must replace | Directive | NE2 |
| A4 | monthly | Attribute | D2 |
| E2 | the wheels | Evidence | D2 |
| A5 | at three o'clock p.m. | Attribute | E2 |
| A6 | with his mother watching | Attribute | E2 |
| A7 | in the backyard | Attribute | E2 |

In the example data table above, for ease of understanding, the identifier is given as one or more letters associated with the determined category followed by a number that uniquely identifies the element within the category. In practice, the identifier may be any alphanumerical value that uniquely identifies the element within the rule and need not necessarily identify the category. Further still, in one embodiment, no identifier is expressly stored in the table and instead a memory address where the entry is stored may serve as an implicit identifier. In this embodiment, the references may comprise pointers to memory locations of the referenced entries.

In the example above, some of the various attributes logically may relate to more than one of the identified named entities, directives, or evidence elements, but each attribute is assigned only one reference to a named entity, directive, or evidence element that is determined based on position of the attribute. For example, when an attribute is identified, a reference is stored to the named entity, directive, or evidence element immediately preceding the identified attribute in the rule. Thus, for example, in the entry for the attribute "monthly," the data table stores a reference to the directive element "must replace" that immediately proceeds it in the phrase "must replace monthly the wheels . . . " If the phrase was instead written as, "must replace the wheels monthly . . . ," the attribute element "monthly" would instead have a reference to the evidence element "wheels." In alternative embodiment, a different position-based rule is applied to determine to which element an attribute is referenced. For example, an attribute may be referenced to a named entity, directive, or evidence element directly following it. In other embodiments, a grammatical analysis may be used to determine which element an attribute is best associated with, that is not necessarily position-based. In other alternative embodiments, an attribute may be referenced to multiple elements.

In alternative embodiments, the elements may be parsed according to different parsing rules. For example, while in the example above, "Jack and Jill" are treated as a single named entity, other parsing algorithms may be applied that treat Jack and Jill respectively as separate named entities. Similarly, while in the example above, the attributes "at three o'clock pm," "in the backyard," and "with his mother watching" are treated as three separate attributes, other parsing algorithms may be applied that treat these attributes as a single attribute. The particular parsing rules may be selectable depending on personal preference. For example, an enterprise may select whether multiple consecutive components within a single element category (e.g., "Jack and Jill") are treated as a single element or as separate elements. Furthermore, the enterprise may control this option separately for different element types (e.g., an enterprise may select to group named entities together when combinable but not to group related attributes).

In one embodiment, the data table (or a separate table) may store additional entries for metadata that is not expressly stated in the text of the rule. For example, in one embodiment, the data table (or a separate table) may include entries for types of supporting evidence that be used to show that a particular component of the rule is met. Examples of support evidence may include, for example, data records, photographs, receipts, performance logs, or other documentation. Supporting evidence may be linked in the data structure to one or more other elements. Furthermore, in one embodiment, the data table (or a separate table) may store entries for a basis type indicating a source location for supporting evidence. The basis fields are typically linked to at least one support evidence entry and may also be linked to other elements. The supporting evidence and basis fields may be populated based on a natural language processing of the text of the rule or may be manually entered by an administrator.

An example of metadata entries that may be associated with the rule above is illustrated in Table 2 below, which may be an extension of Table 1 or a separate table associated with the same rule:

TABLE 2

| ID | Content | Category | References |
|---|---|---|---|
| SE1 | Birth Certificates | Supporting Evidence | A1 |
| SE2 | Photographs | Supporting Evidence | A3 |
| B1 | Records Database | Basis | SE1, SE2 |

In Table 2, the content field is populated with a description of the supporting evidence or basis that may derived from the text of the rule if not expressly stated. For example, in this case, satisfying the attribute A1 (that Jack and Jill are boy and girl respectively) may be demonstrated by birth certificates and satisfying the attribute A3 (in red) may be demonstrated by photographs of the wagon. Furthermore, Table 2 indicates that a records database may provide the basis for supporting evidence SE1, SE2.

Figure 3:
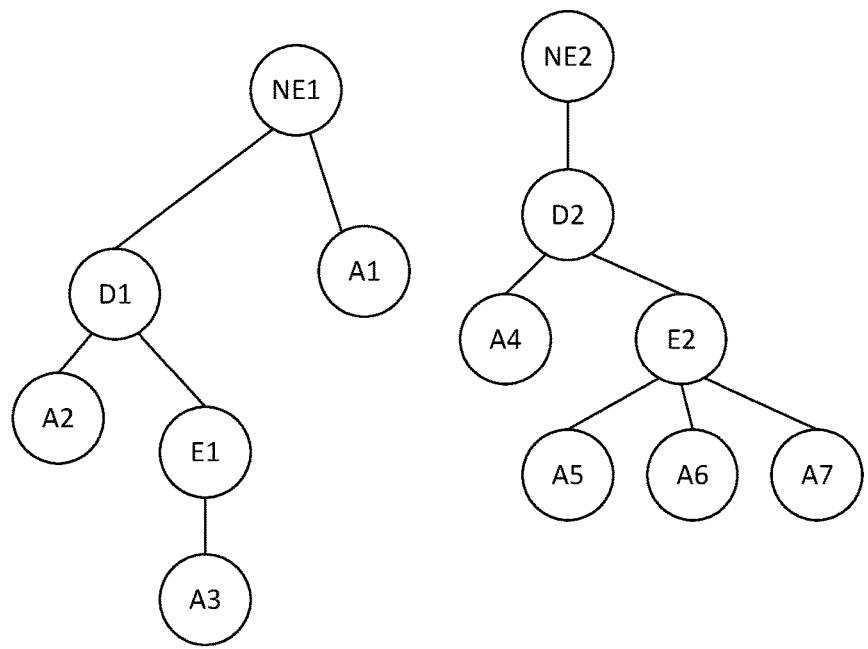
FIG. 3 is a diagram illustrating an example embodiment of a data structure for parsing rules into tasks.

The task mapper 206 maps the data table to a discrete set of tasks that must be performed for an entity to be compliant with a particular rule or set of rules. For example, in one embodiment, the task mapper 206 models the data table as a tree structure in which the named entity, directive, object, and attribute elements correspond to nodes and the references correspond to branches between the nodes. Generally, the named entities correspond to root nodes, the directives and objects correspond to intermediate node and the attributes correspond to leaf nodes. In the case that an object does not have any attributes, the object may instead correspond to a leaf node. An example of this data structure for the example rule of Table 1 is illustrated in FIG. 3.

Each unique path from a root node to a leaf node is identified as a task. Here, the task may be formed by combining the elements in the set of nodes along the unique path.

An example of a task table based on the example rule table above is provided below:

TABLE 3

| Task ID | Entity | Directive | Evidence | Relevant Attributes |
|---------|--------|-----------|----------|---------------------|
| 1 | (NE1) Jack and Jill | | | (A1) who shall be a boy and girl respectively. |
| 2 | (NE1) Jack and Jill | (D1) must paint | | (A2) annually |
| 3 | (NE1) Jack and Jill | (D1) must paint | (E1) the wagon | (A3) red. |
| 4 | (NE2) Joe | (D2) must replace | | (A4) monthly. |
| 5 | (NE2) Joe | (D2) must replace | (E2) the wheels | (A5) at three o'clock pm. |
| 6 | (NE2) Joe | (D2) must replace | (E2) the wheels | (A6) with his mother watching. |
| 7 | (NE2) Joe | (D2) must replace | (E2) the wheels | (A7) in the backyard. |

In some embodiments, a grammar analysis and correction may be applied to each of the tasks to further refine the grammar. For example, task 1 in Table 3 may be corrected to read "Jack and Jill who shall be a boy and girl respectively." Furthermore, in cases where an attribute is associated with a directive element, an evidence element associated with the directive element may also be included in the corrected task statement even though it may outside the direct path from the root node to the leaf node. For example, task 2 may be modified to state "Jack and Jill must paint the wagon annually" even though "the wagon" is not in the direct path from NE1 to A2.

The metric calculator 204 generates a compliance score for each rule that provides an objective indication of a compliance level. In an embodiment, the compliance score for a given rule is based on a percentage of the tasks that are met for the rule. For example, the metric calculator 204 may determine from the information in the evidence database 212 how many of the tasks are met. A percentage of the total number of tasks met may be calculated as a compliance score for the rule. Thus, in the example rule above, 100% compliance is achieved when all eight tasks are met for the rule.

In another embodiment, a metric-based scoring may be utilized in which a number of metrics for a given rule may be calculated based on a sum of the total number of unique entries for named entities, directives, evidence, and attributes. For example, in the example rule above there are two named entities, two directives, two objects, and seven attributes for a total of 13 metrics that must be met to achieve 100% compliance. In one embodiment, the number of unique identifiers in the supporting evidence entries for the rule may also be included in the sum that contributes to the metric score. The metric calculator 204 then determines from the information in the evidence database 212 how many of the individual metrics are met. A percentage of the total may be calculated as a compliance score for the rule.

In one embodiment, each task (from the task table) has an associated total score based on the number of elements in that task. For example, in Table 3, the first task has one named entity, one directive and one attribute and thus contributes a score of 3 to an overall metric score if the entire task is satisfied (presuming in this example that supporting evidence does not contribute to the metric score). In one embodiment, overlapping elements (that are part of more than one task) are only counted once in the total metric score and are not double-counted if multiple tasks are satisfied. For example, in Table 3, task 1 and task 2 each have 3 elements. However, the "named entity" element (NE1) overlaps. Thus, if both tasks are shown to be complete, a metric score of 5 is calculated for these two tasks corresponding to the number of unique elements.

In another embodiment, a metric-based scoring may be used that counts all of the elements separately in the task table without only counting unique elements. Thus, in this scoring system, task 1 contributes a score of 2 if met, task 2 contributes a score of 3 if met, and so on for a total possible metric score of 24.

In one embodiment, a partial score may be computed for one or more tasks if supporting documents show evidence of a particular element but do not provide enough information to conclude whether other elements of the tasks are met. As an example referring to task 3 in the table above, the evidence database 212 may include a photograph of a wagon with red paint. This photograph provides evidence of E1 ("wagon"), the directive D1 ("must paint"), and the attribute A3 ("red") but does not indicate anything about what named entity painted the wagon. Thus, the supporting document shows that some elements are present, but it cannot be concluded whether the task is satisfied. Absent further documentation, a metric score of 3 may be assigned for this task because 3 elements are supported by the supporting document. If an additional supporting document providing a certified records log indicates that the wagon was painted by Jack and Jill, then additional element NE1 ("Jack and Jill may be deemed met and the score for the task increased to four.

In some cases, supporting documents may instead indicate that a particular element is not met. For example, similar to the example above, a photograph may show a wagon painted in red. However, if a records log indicates that the wagon was in fact painted by Tom, and not by Jack and Jill, then the scores relating to the task of painting the wagon may revert to zero. In other words, the scores associated with one element of a task may be zeroed out if it becomes known conclusively that the elements previously counted as being satisfied do not in fact contribute to satisfying a particular task from the task table.

The dashboard generator 210 generates a dashboard user interface that can be viewed on a client 130, for example, as a web site or via an installed application. For example, the dashboard user interface may be viewed by a business or other entity to view information relevant to achieving compliance. This may be useful to track the various standards the entity seeks to comply with, easily view a breakdown of the rules required to achieve compliance presented in an easy-to-understand manner, and view a quantitative measure of compliance. For example, in one embodiment, the dashboard user interface may provide a display of each rule in which elements in the text of the rule are color-coded based on their respective element categories. Furthermore, the dashboard user interface may provide a table listing the identified elements by category. Cells in the table may also indicate references to other associated entries showing the links between the different elements in the rule. Furthermore, in one embodiment, a metric count may be shown for each category together with a total metric count. An example embodiment of a dashboard user interface is shown in FIG. 6 described below.

Figure 4:
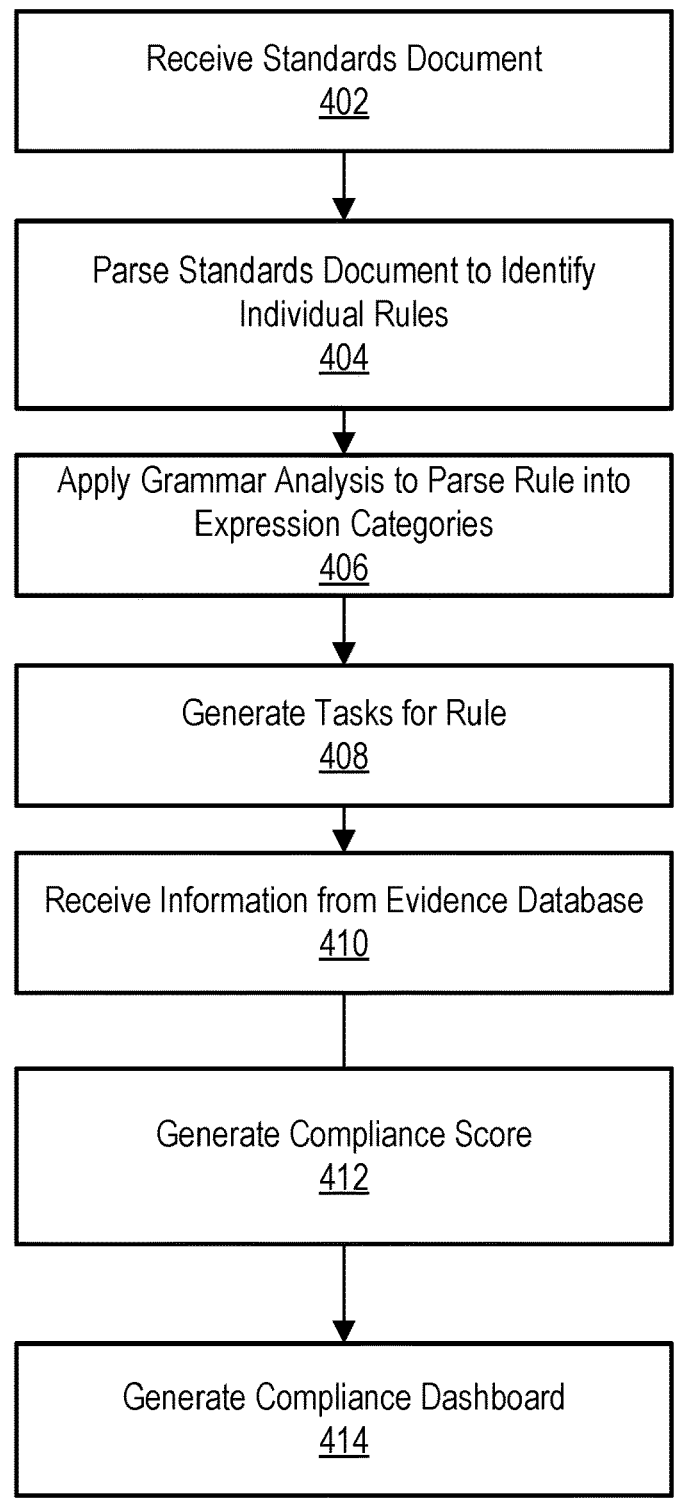
FIG. 4 is a flowchart illustrating an example embodiment of a process for generating metrics based on language processing of a rule in a standards document.

FIG. 4 illustrates an example embodiment of a process for generating a compliance score for a rule or set of rules in a standards document. The compliance server 110 receives 402 a standards document that specifies one or more rules. The compliance server 110 parses 404 the standards document to identify individual rules. In one embodiment, the language parser 202 can automatically recognize individual rules by detecting identifiers in the text that are indicative of the start of a new rule. For example, rules may be numerically or alphanumerically ordered in a list and these numbers or characters identifying a start of a new rule can be identified. In another embodiment, the language parser 202 may search for end-of-sentence characters and treat each sentence as a separate rule. In yet another embodiment, the compliance server 110 may generate a display of the text of the digital document accessible to a client 130 (e.g., via a web site or other application user interface) and may recognize inputs from an administrator using the client 130 to manually identify the individual rules. For example, the client 130 may receive a selection of text having a start point and an end point and then receive a selection of a control indicating that the selected text represents an individual rule. Upon identifying the individual rules, the compliance server 110 may generate a new data structure (e.g., the data table described above) associated with the rule.

The compliance server 110 applies 406 a grammar analysis to each individual rule to categorize elements in the rule into appropriate element categories. For example, in one embodiment, the compliance server 110 may apply a grammar analysis to identify one or more grammatical subjects in the rule and categorize the grammatical subjects in the named entities category. Furthermore, the compliance server 110 may identify one or more verbs applied to the grammatical subject and categorize the verbs in the directives category. The compliance server 110 also identifies one or more direct objects of the verbs and categorizes the one or more direct objects in the evidence category. Prepositional or adverb phrases (e.g., descriptors or modifiers) corresponding to one of the identified subjects, verbs, or direct objects are identified and may be categorized in the attributes category. For each identified component, a new entry in the data table associated with the rule is created as described above. Furthermore, links to related entries may be identified and stored based on the grammar analysis, thus generating a tree data structure like that shown in FIG. 3

In one embodiment, instead of automatically identifying the elements of the rules, the compliance server 110 may present a user interface that enables an administrator to manually identify and categorize the elements. For example, the user interface may present text of the rule on a client 130 and a plurality of controls each corresponding to one of the element categories. The client 130 may receive a selection of a portion of the text of the rule and then receive a selection of one of the element category controls. In response, the selected text is categorized according to the received control selection. For example, a new entry in the data table is generated for each new identified element as described above. In an embodiment, the client 130 may furthermore receive a selection of a control to link a particular element to another element. These controls cause references to be stored in the data table associating the linked elements with each other. In an embodiment, the user interface may in real-time provide a table showing each of the categories and the elements assigned to each. Furthermore, in one embodiment, the user interface may update the text of the rule in real-time with color coding indicating which elements have been assigned to which category. Further still, the user interface may illustrate the assigned links between elements.

In one embodiment, the grammar analysis may further determine types of supporting evidence that may be used to show compliance with the rule and basis types indicating sources of the supporting evidence. For example, in one embodiment, the supporting evidence and basis types may be automatically inferred from natural language processing of the rule even if not expressly stated. In another embodiment, the supporting evidence and basis types may be manually entered by an administrator via a user interface.

Tasks for the rule are then determined 408 as described above. For example, the tasks may be determined by traversing the data tree structure to identify each unique path from a root node to a leaf node and combining the elements along each unique path to form each respective task.

The compliance server 110 may receive 410 evidence information from the evidence database 212 related to compliance of an entity with the rule. For example, in one embodiment, the compliance server 110 may receive raw documents such as data logs, internal memos, or other records that could be used to show compliance with a rule. In another embodiment, the compliance server 110 may receive from the evidence database 212 answers to questionnaires supplied by an entity that may indicate compliance or non-compliance with a particular rule or portion thereof. In one embodiment, the information from the evidence database 212 may simply comprise binary values indicating a yes or no answer to whether a particular task has been completed or whether a particular element of the rule is met. In the case of raw documents, the compliance server 110 may perform a language or data processing analysis of the documents to automatically determine whether or not the document is sufficient to show completion of a particular task.

A compliance score is then generated 412 for each rule indicating a quantitative assessment of how compliant the entity is with the rule based on the evidence provided. For example, in one embodiment, the compliance score may be generated as a percentage of the tasks that are met based on a mapping of the evidence information to the tasks. In another embodiment, the compliance score may be computed as a percentage of elements associated with the rule that are satisfied by the evidence information. Here, a metric count may be determined as the number of unique elements in the rule or the total number of elements in the set of tasks generated from the rule. The compliance score may be computed as a percentage of the total based on the number of elements that can be deemed satisfied based on the evidence information.

A compliance dashboard may be generated 414. The compliance dashboard provides information useful to an entity for helping it to understand the rules, its current level of compliance, and how to ensure future compliance. An example of a compliance dashboard interface is illustrated in FIG. 6 and described in further detail below.

Figure 5:
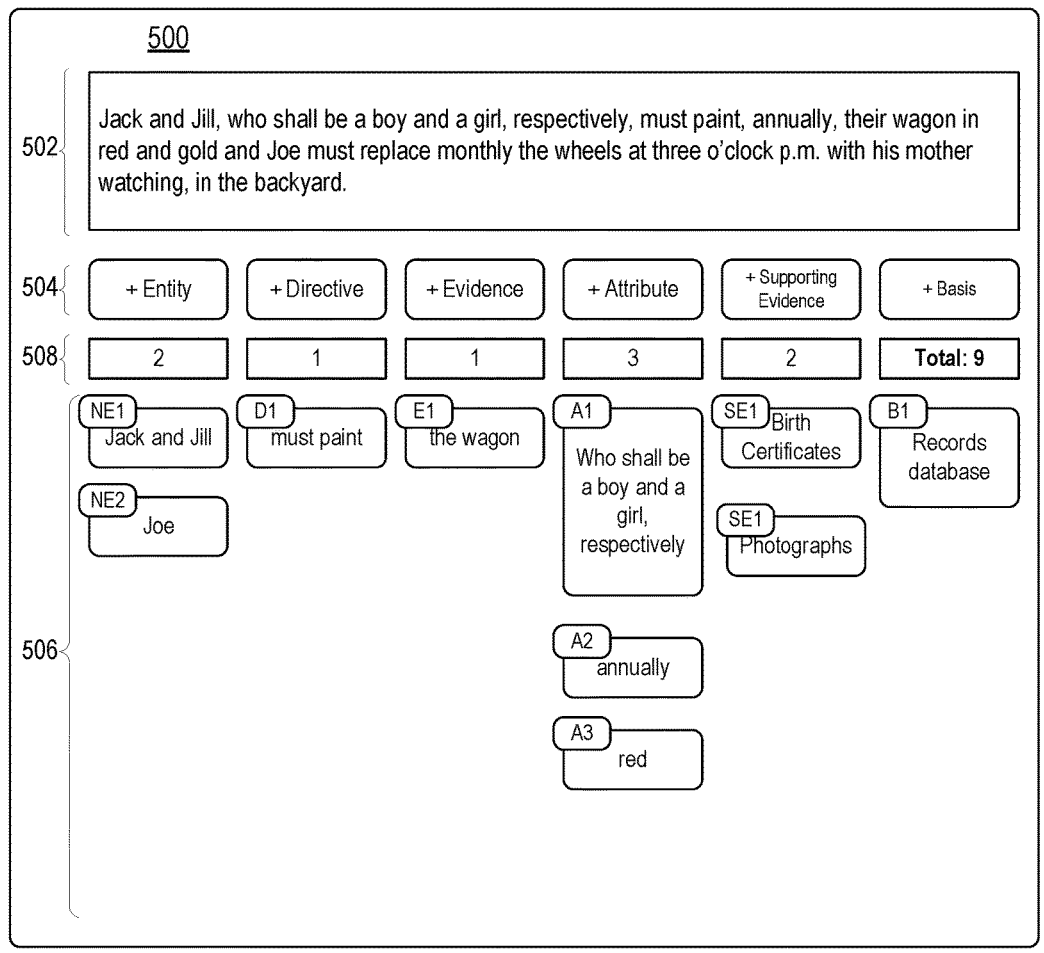
FIG. 5 is an example user interface diagram of an administrator interface for parsing language of a rule into different element categories and automatically generating metrics associated with the rule.

FIG. 5 illustrates an example embodiment of an administrator user interface 500 that may be used to manually generate the data table for a particular rule or edit an automatically generated table. This example is partially populated based on the example rule above and thus represents an intermediate stage in generating the data table. The interface shows a text box 502 providing the text of the rule, which may be color-coded based on the element category as described above. The text in the text box 502 is selectable, for example using a mouse or other pointer device. After selecting text in the text box 502, a category button 504 may be selected to generate a new element object 506 corresponding to the selected text. If no text is selected, a category button 504 may be selected to create a blank element object 506, which may be manually populated with text. Furthermore, individual element objects 506 may be selected to add or edit references to other linked entries. A score set 508 provides metric counts for each category and a total count for the elements identified. The score set 508 may be updated in real-time as the text of the rule 502 is categorized. In one embodiment, the interface 500 may first be automatically populated based on an automated grammar analysis of the rule 502. Then, the controls described above may be used to manually edit the categorization and links between entries, if desirable.

FIG. 6 illustrates an example interface for a compliance dashboard 600 for a particular rule. The compliance dashboard 600 illustrates the text 602 of the rule, which may be color coded as described above. Column headers 604 illustrate the various element categories (e.g., named entit(ies), directive(s), evidence, and attribute(s)) and other metadata (e.g., supporting evidence and basis) identified from the rule. The text entries 606 associated with each category are then displayed under the appropriate columns. In one embodiment, identifiers are shown in each cell indicating the identifier for that cell (e.g., in the upper right) and references to other associated entries (e.g., in the lower right), if any. In this example, scores 608 indicate the number of unique metrics in each category. In other embodiments, a different scoring system may be applied as discussed above. The compliance dashboard 600 beneficially presents the rule in a way that is easy to understand and can be assessed in an objective and quantitative manner using the supplied scores.

FIG. 7 illustrates another example interface for a compliance dashboard 700 associated with a set of rules relevant to an enterprise. In this view, a table provides a rule identifier 702 and the rule text 704 for each identified rule. The tasks 706 are shown as generated from the text of each rule. A compliance score 708 representing a level of compliance with the actionable objections is also provided.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, in alternative embodiments, functional modules and processes described as being performed by the compliance server 110 may be instead be implemented on a client 130. Furthermore, some functional modules and processes may be implemented partly on the compliance server 110 and partly on a client 130.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method for generating metrics associated with a digital document, the method comprising:
    receiving, by a server, a digital standards document comprising a plurality of rules;

identifying each of the plurality of rules in the digital standards document;

for a target rule in the plurality of rules, identifying elements of text of the target rule that meet respective criteria for a predefined set of element categories, wherein the predefined set of element categories includes an entity category, a directive category, an evidence category, and an attributes category, and wherein identifying the elements comprises:

identifying a grammatical subject of the target rule and assigning the grammatical subject to the entity category;

identifying a grammatical verb representing an action to be performed by the grammatical subject and assigning the grammatical verb to the directive category;

identifying a grammatical direct object on which the grammatical verb operates and assigning the grammatical direct object to the evidence category; and identifying a grammatical modifier modifying the grammatical subject, verb, or direct object and assigning the grammatical modifier to the attributes category;

generating, by a processor, a metric count for the target rule based on a total count of the elements meeting the respective criteria for the predefined set of element categories;

receiving, by the server, evidence information indicating whether or not each of the elements are satisfied;

determining a compliance count representing a number of the elements in the target rule satisfied by the evidence information; and generating a compliance score for the target rule based on the metric count and the compliance count.

2. The computer-implemented method of claim 1, further comprising:

storing a reference to the grammatical subject in association with the grammatical verb corresponding to the grammatical subject;

storing a reference to the grammatical verb in association with the grammatical direct object on which the grammatical verb operates; and storing a reference to the grammatical subject, verb, or direct object in association with the grammatical modifier.

3. The computer-implemented method of claim 1, further comprising:

generating a data table for the target rule having a plurality of entries corresponding to the elements, each of the plurality of entries having a plurality of fields, wherein the plurality of fields for a target element includes a content field storing text of the target element, an element category field storing a category identifier for an element category associated with the target element, and a references field storing references to one or more related elements.

4. The computer-implemented method of claim 1, further comprising:

generating a compliance dashboard user interface displaying a plurality of columns corresponding to the plurality of element categories and populating the identified elements according to their respective element categories.

5. The computer-implemented method of claim 1, wherein identifying the elements comprises:

applying a grammar analysis to the target rule to automatically categorize the elements into the element categories.

6. The computer-implemented method of claim 1, wherein identifying the elements comprises:

generating a display of text of the target rule;

receiving a selection of a portion of the text of the target rule;

receiving a selection of an element category button corresponding to a selected element category;

generating an entry in a data table for a new element, the entry including a text field storing the selected portion of the text and an element category field storing an element category identifier for the selected element category;

generating for display, the selected portion of the text as an element object in a portion of the display corresponding to the selected element category.

7. The computer-implemented method of claim 6, further comprising:

receiving a selection of the displayed element object;

receiving a selection of a related element object corresponding to a related element;

storing in the entry in the data table, a reference to the related element; and generating for display in association with the displayed element object, an identifier for the related element.

8. The computer-implemented method of claim 1, wherein generating the metric count further comprises:

identifying one or more supporting evidence types associated with the rule; and generating the metric count as a sum of the total count of the elements derived from the text of the target rule and the one or more supporting evidence types.

9. The computer-implemented method of claim 1, further comprising:

generating a data structure comprising a plurality of nodes corresponding to the identified elements and a plurality of edges representing associations between the identified elements;

identifying each unique path from a root node to a leaf node in the data structure; and generating a task associated with a combination of elements in each of the unique paths.

10. The computer-implemented method of claim 1, further comprising:

determining a number of tasks satisfied based on the evidence information; and generating a task completion score based on the number of tasks satisfied out of a total number of tasks.

11. A non-transitory computer-readable storage medium storing instructions for generating metrics associated with a digital document, the instructions when executed by a processor causing the processor to perform steps including:

receiving a digital standards document comprising a plurality of rules;

identifying each of the plurality of rules in the digital standards document;

for a target rule in the plurality of rules, identifying elements of text of the target rule that meet respective criteria for a predefined set of element categories, wherein the predefined set of element categories includes an entity category, a directive category, an evidence category, and an attributes category, and wherein identifying the elements comprises:

identifying a grammatical subject of the target rule and assigning the grammatical subject to the entity category;

identifying a grammatical verb representing an action to be performed by the grammatical subject and assigning the grammatical verb to the directive category;

identifying a grammatical direct object on which the grammatical verb operates and assigning the grammatical direct object to the evidence category; and identifying a grammatical modifier modifying the grammatical subject, verb, or direct object and assigning the grammatical modifier to the attributes category;

generating a metric count for the target rule based on a total count of the elements meeting the respective criteria for the predefined set of element categories;

receiving, by the server, evidence information indicating whether or not each of the elements are satisfied;

determining a compliance count representing a number of the elements in the target rule satisfied by the evidence information; and generating a compliance score for the target rule based on the metric count and the compliance count.

12. The non-transitory computer-readable storage medium of claim 11, the instructions when executed further causing the processor to perform steps including:
   receiving a selection of the displayed element object;
   storing a reference to the grammatical subject in association with the grammatical verb corresponding to the grammatical subject;
   storing a reference to the grammatical verb in association with the grammatical direct object on which the grammatical verb operates; and
   storing a reference to the grammatical subject, verb, or direct object in association with the grammatical modifier.

13. The non-transitory computer-readable storage medium of claim 11, the instructions when executed further causing the processor to perform steps including:
   receiving a selection of the displayed element object;
   generating a data table for the target rule having a plurality of entries corresponding to the elements, each of the plurality of entries having a plurality of fields, wherein the plurality of fields for a target element includes a content field storing text of the target element, an element category field storing a category identifier for an element category associated with the target element, and a references field storing references to one or more related elements.

14. The non-transitory computer-readable storage medium of claim 11, the instructions when executed further causing the processor to perform steps including:
   receiving a selection of the displayed element object;
   generating a compliance dashboard user interface displaying a plurality of columns corresponding to the plurality of element categories and populating the identified elements according to their respective element categories.

15. The non-transitory computer-readable storage medium of claim 11, wherein identifying the elements comprises:
   applying a grammar analysis to the target rule to automatically categorize the elements into the element categories.

16. The non-transitory computer-readable storage medium of claim 11, wherein identifying the elements comprises:
   generating a display of text of the target rule;
   receiving a selection of a portion of the text of the target rule;
   receiving a selection of an element category button corresponding to a selected element category;
   generating an entry in a data table for a new element, the entry including a text field storing the selected portion of the text and an element category field storing an element category identifier for the selected element category;
   generating for display, the selected portion of the text as an element object in a portion of the display corresponding to the selected element category.

17. The non-transitory computer-readable storage medium of claim 11, wherein the instructions when executed further causing the processor to perform steps including:
   generating a data structure comprising a plurality of nodes corresponding to the identified elements and a plurality of edges representing associations between the identified elements;
   identifying each unique path from a root node to a leaf node in the data structure; and
   generating a task associated with a combination of elements in each of the unique paths.

18. The non-transitory computer-readable storage medium of claim 11, wherein the instructions when executed further causing the processor to perform steps including:
   determining a number of tasks satisfied based on the evidence information; and
   generating a task completion score based on the number of tasks satisfied out of a total number of tasks.

* * * * *